July 24, 1956
H. A. STEBBINS
2,755,558
GAGING HEAD FOR PNEUMATIC BORE GAGE
Filed June 19, 1953
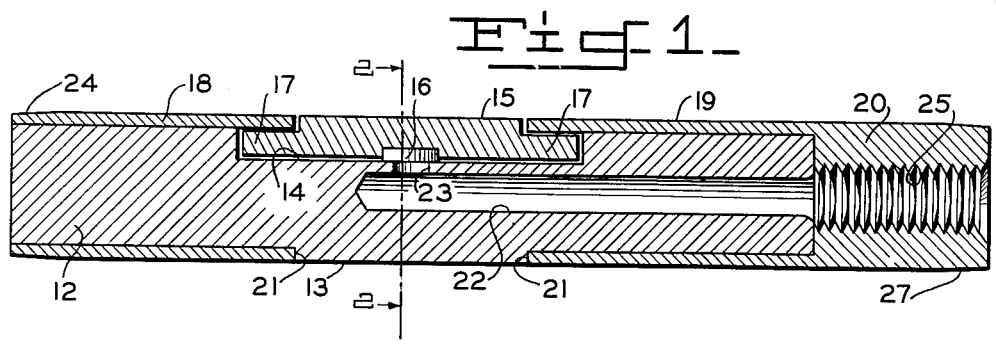
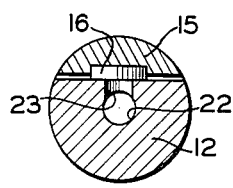
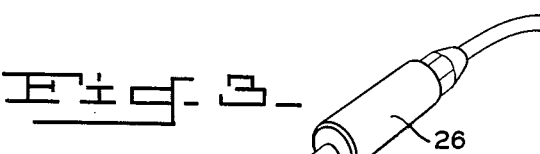
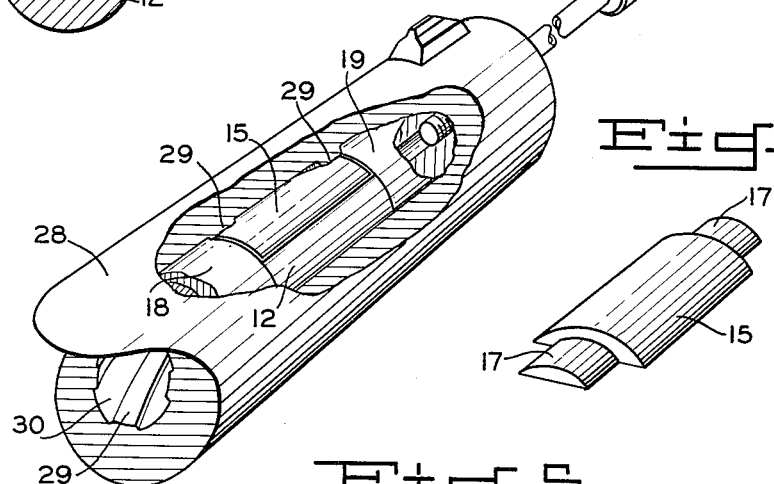
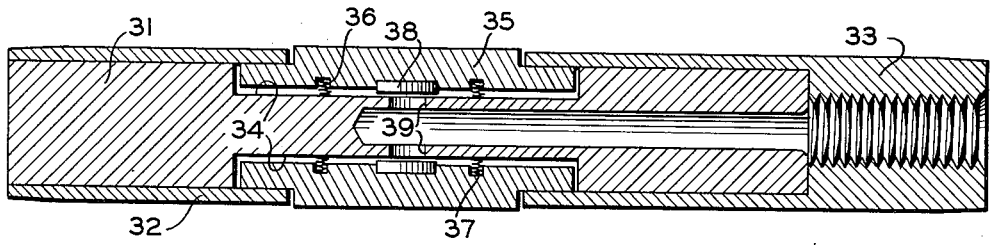
INVENTOR.
Herve A. Stebbins
BY W. E. Thibodeau + A. W. Dew
ATTORNEYS

United States Patent Office 2,755,558
Patented July 24, 1956

2,755,558

GAGING HEAD FOR PNEUMATIC BORE GAGE

Herve A. Stebbins, Springfield, Mass.

Application June 19, 1953, Serial No. 362,978

6 Claims. (Cl. 33—178)

(Granted under Title 35, U. S. Code (1952), sec. 266)

The invention described herein may be manufactured and used by or for the Government for governmental purposes without the payment of any royalty thereon.

This invention relates to fluid-operated devices for measuring relatively small changes in the bore diameters of rifled tubes and is more particularly directed to an improved gaging head therefor.

In one type of fluid-operated gages, compressed air is admitted therein through an automatic compensating pressure regulator and passes along a vertical transparent indicator tube and out through an opposed pair of orifices in a gaging head or spindle. A float in the indicator tube is free to move vertically in response to changes in the quantity of air passing through the tube and around the float. The spindle is adapted for helical movement through the piece to be gaged and the clearance between the bore surface therein and the top of each orifice in the spindle controls the amount of air flow therethrough which in turn actuates the float to indicate the bore diameter at any given instant during the gaging operation.

This type of gage is particularly adapted for measuring the bore diameters of rifled gun barrels when the spindle is provided with annularly disposed locating pads which engage in the grooves between adjacent lands in the rifling to maintain the orifices in the spindle in vertical alignment with the particular pair of lands to be gaged. However, the gaging spindle presently in use has not proven entirely satisfactory in some respects. For example, the exposed location of the orifices therein render them particularly vulnerable to the erosive action of dirt and grit which invariably destroys the required accuracy of gaging in a relatively short period of time. Moreover, such exposure of the orifices brings the flow of air into direct contact with the surfaces to be gaged. Consequently, even such slight surface irregularities as those produced by a final reaming operation serve to admit a greater flow of air through the orifices in the spindle than is warranted by the minimum distances between the surfaces of opposite lands.

Accordingly, it is an object of this invention to provide an improved air gage spindle for measuring changes in the bore diameters of rifled tubular members wherein the orifices provided in the spindle for the passage of air therethrough are protected against direct initial exposure to the bore surface of the workpiece being gaged.

Another difficulty inherent in the prior art type of air gages for measuring the bore diameter of rifled gun barrels lies in the fact that the necessity for engagement of the locating pads on the spindle with the rifling grooves in the barrel permits measurement of but one pair of opposed lands at a time. Obviously, in order to determine the existence of any eccentricity in the bore of the barrel, each pair of opposite lands must be individually measured along their entire length before starting on an adjacent pair. As a result, the gaging of the entire barrel is a relatively time-consuming procedure which requires considerable manipulation of the spindle in changing the locating pads from one set of rifling grooves to another.

In addition, the sliding contact between the sides of the locating pads and the sides of the lands creates such considerable wear on the pads in a relatively short period of time as to require an expensive rebuilding operation in order to maintain the desired accuracy of gaging.

Another object of this invention, therefore, is the provision of an air gage spindle for measuring changes in the distances between each pair of opposed lands in a rifled gun barrel wherein the construction of the spindle eliminates the necessity for the prior art engagement thereof with the helical grooves of the barrel for aligning the gaging orifices with one of the pairs of lands in the barrel.

A further object of this invention lies in the provision of an air gage spindle for measuring changes in the distances between each pair of opposed helically extending lands in a rifled gun barrel wherein the spindle is freely rotated therein and includes a novel gaging pad arranged to provide simultaneous peripheral contact with at least two adjacent lands in order to prevent tilting of the spindle about a single land in the bore of the barrel.

A specific object of this invention is the provision of a superior air gaging spindle for use in measuring changes in diameter of the bores of rifled gun barrels which is simple to operate, durable in construction, and relatively inexpensive to restore to the desired accuracy after sufficient wear has occurred to warrant correction thereof.

The specific nature of the invention as well as other objects and advantages thereof will clearly appear from a description of a preferred embodiment as shown in the accompanying drawings in which:

Fig. 1 is a longitudinal sectional view of one form of the gaging spindle of the present invention;

Fig. 2 is a cross-sectional view taken along line 2—2 of Fig. 1;

Fig. 3 is a perspective view of a rifled firearm barrel which is cut away to show the engagement between the lands thereof and the gaging pad of the spindle of Fig. 1;

Fig. 4 is a perspective view of the gaging pad; and

Fig. 5 is a longitudinal cross-sectional view of an alternate form of air gage spindle provided with an oppositely disposed pair of gaging pads.

As shown in the drawings, the improved gaging spindle of the present invention essentially comprises a substantially cylindrical core 12 having a central portion 13 of increased diameter. A centrally disposed segmental recess 14 of greater length than central portion 13 is provided in core 12 to movably seat a gaging pad 15 formed as a substantially right angle segmental section of a cylinder equivalent in diameter to core portion 13. The length of gaging pad 15 is slightly less than that of recess 14 so as to permit longitudinal movement therein while the width of pad 15 is such that the exterior periphery thereof is substantially equivalent to one-third of the circumference of core portion 13. The underside of pad 15 is provided with a centrally located projecting cylindrical insert 16 which upon contact with the floor of recess 14 raises pad 15 sufficiently to complete the cylindrical symmetry of core portion 13. Pad 15 is concentrically reduced in diameter at both ends thereof as best shown at 17 in Fig. 4 in order to permit entry thereof into a hollow sleeve 18 preferably press-fitted onto the forward end of core 12 and into a similar hollow sleeve portion 19 of an adaptor 20 press-fitted onto the rear end of core 12. The width of reduced ends 17 is such that the exterior periphery thereof is substantially equivalent to one-third of the circumference of the interior periphery of sleeves 18 and 19. Sleeves 18 and 19 are arranged to abut the shoulders 21 formed by central portion 13 of core 12 and retain paid 15 in recess 14 without interfering with the longitudinal movement thereof since the space between the inner ends of such sleeves is slightly greater than the length of the larger diameter portion of gaging pad 15. The internal diameters of sleeves 18 and 19 are sufficient to permit the required outward radial movement of gaging pad 15 in recess 14 while the wall thicknesses of the sleeves bring the exterior peripheries thereof into alignment with the exterior periphery of core portion 13 to equalize the cylindrical symmetry of core 12.

An axial bore 22 is provided in one end of core 12 and extends longitudinally therein to terminate slightly beyond the center thereof. Communication between bore 22 and the center of segmental recess 14 is provided by a cylindrical orifice 23 disposed in vertical alignment with insert 16 and of lesser diameter relative thereto. Sleeve 18 is provided with a tapered front end as shown at 24 to facilitate insertion of the spindle in the bore to be gaged. Adaptor 20 is provided with a threaded axial bore 25 adapted to be engaged by any suitable tubular handle 26 by means of which the spindle is manipulated. The rear end of adaptor 20 is also tapered as shown at 27 to permit re-entry of the gaging spindle into the front end of the bore being gaged following a complete reverse of the spindle therethrough.

There is shown in Fig. 3 a firearm barrel 28 of the type for which the gaging spindle is particularly adapted. Such barrel is provided with opposed pairs of helically extending lands 29 which are formed by corresponding helical grooves 30. Thus, when the gaging spindle is inserted in barrel 28 and the air pressure is activated, the resulting flow of air passes into axial bore 22 and thence into orifice 23 to be directed against cylindrical insert 16. The resulting outward radial lifting of gaging pad 15 brings the exterior periphery of the larger diameter portion thereof into contact with the surfaces of lands 29 which form the bore diameter to be gaged. The rectangular configuration of gaging pad 15 is such that despite rotation of the spindle in barrel 28 the exposed arcuate periphery of such pad will contact at least two adjacent lands 29 as best shown in Fig. 3 and thereby prevent any tilting thereof about a single land as a fulcrum although still permitting the necessary inclination of the pad in the event one land is higher than the one adjacent thereto. The clearance between the top of orifice 23 and the bottom of insert 16 controls the flow of air through axial bore 22 and consequently operates suitable instrumentation (not shown) which is responsive to either the pressure or the volume of air passing therethrough. The clearances between the surfaces of gaging pad 15 and those of segmental recess 14 and the ends of sleeves 18 and 19 serve as a passage for the flow of air out of the spindle and through the helical grooves 30 of barrel 28.

It has been found that a spindle of the construction described above can only be employed in gaging relatively small bores on the order of .300 of an inch or less inasmuch as the air pressure to which the indicating apparatus is responsive is limited to approximately ten pounds and therefore would not be sufficient to raise any larger gaging pad into contact with the bore surface being gaged. Accordingly, the present invention also contemplates a gaging spindle of the type shown in Fig. 5 which is substantially similar to the one illustrated in Fig. 1 in that there is provided a core 31 having a sleeve 32 press-fitted onto one end thereof and an adapter sleeve 33 similarly fitted onto the opposite end. However, in this gaging spindle, core 31 is provided with diametrically disposed rectangular recesses 34 each of which receives a gaging pad 35 of the same configuration as pad 15 of Fig. 1. The underside of each pad 35 is provided with a pair of spaced-apart, relatively shallow holes 36 into which coil springs 37 are inserted to continually bias pads 35 radially outward into contact with the bore surface of the barrel being gaged. Any reduction in the bore diameter of the barrel as measured between opposed lands causes pads 35 to move inwardly against the bias of springs 37 and thereby reduce the clearance between the underside of inserts 38 and the top of orifices 39 to decrease the flow of air therethrough.

Accordingly, there is here provided a superior air gaging spindle wherein the gaging pad is interposed between the orifice and the bore surface of the tube being gaged thereby protecting the orifice against the entry of dirt and grit. Furthermore, since the air flow through the orifice is directed against the relatively smooth surface of an insert mounted in the underside of the gaging pad, the gaging spindle is capable of extreme accuracy since it is not affected by any irregularities in the surface being gaged.

Moreover, as a result of eliminating the locating pads invariably employed in the gaging devices of the prior art, the spindle of the present invention is freely rotatable in the bores of rifled firearm barrels. Accordingly, the distance between any particular set of opposed rifling lands can be readily gaged without the prior art necessity for withdrawing the spindle from the barrel after one set of lands have been gaged in order to reengage the locating pads in another set of opposed grooves and thereby align the orifices in the spindle with the corresponding set of lands.

In addition, the frictional engagement and resulting wear between the exterior periphery of the gaging pad of the present invention and the bore surface of the barrel being gaged as the spindle is moved therethrough is far less than that incurred between the straight sides of the prior art locating pads and the sides of the helical lands. In the event it becomes necessary to restore the dimensional accuracy of the present spindle, the relatively simple periphery of the gaging pad thereof can be replated in considerably less time and with far less expense than would be required by the relatively complicated configuration of the locating and contact pads of the prior art spindles.

Furthermore, inasmuch as the peripheral surface of the gaging pad of the present invention is considerably larger than the contact pad of the prior art and is in simultaneous contact with at least two adjacent lands in the barrel, it can readily be seen that tilting of the present spindle about a single land in the barrel is virtually eliminated. Such freedom from tilting is essential in gaging dimensional variations as low as .0005 inch.

Although a particular embodiment of the invention has been described in detail herein, it is evident that many variations may be devised within the spirit and scope thereof and the following claims are intended to include such variations.

I claim:

1. In an air gage for indicating changes in the bore diameter of a firearm barrel having helical rifling lands, a cylindrical spindle of slightly lesser diameter than the bore to be gaged, said spindle having a longitudinal recess therein, a gaging pad loosely seated in said recess for movement in all outward directions relative to said spindle and comprising a substantially rectangular segmental portion having an exterior periphery concentric with the cylindrical surface of said spindle and of sufficient arcuate extent to contact at least two adjacent lands in the barrel at any radial position therein, said spindle having passage means therein for directing a flow of air against the underside of said gaging pad for lifting said pad radially outward into contact with the lands in the barrel, and sleeve means cooperating with said spindle to loosely retain said gaging pad therein, said gaging pad being so dimensioned relative to said recess as to provide passage means therebetween for exhausting the flow of air from said spindle in accordance with the clearance between the underside of said gaging pad and the bottom of said recess to thereby indicate the diameter between opposed lands at any selected position of said spindle in the barrel.

2. In an air gage spindle for indicating changes in the bore diameter of a firearm barrel having helical rifling lands, a cylindrical body having a central portion of larger diameter than the end portions thereof but of slightly smaller diameter than the bore to be gaged, said central portion of said body having a substantially rectangular recess therein extending in either direction into said reduced diameter end portions, a gaging pad loosely seated in said recess for movement in all outward directions relative to said spindle and comprising a substantially rectangular segmental portion having an exterior periphery concentric with the cylindrical surface of said central portion of said body, said gaging pad having a rectangular configuration for effecting contact of said exterior periphery thereof with at least two adjacent lands in the barrel at any radial position therein, said gaging pad being of concentrically reduced diameter at either end thereof, a sleeve press-fitted onto either reduced diameter end of said body over said reduced diameter end of said gaging pad for loosely retaining said gaging pad in said body, said cylindrical body having a longitudinal axial bore extending into one end thereof to terminate slightly beyond the center and an orifice between said bore and said rectangular recess for providing passage of a flow of air therethrough, said gaging pad having an insert projecting from the underside thereof in position to receive the flow of air passing out of said orifice whereby said gaging pad is lifted radially outward into contact with the rifling lands in the barrel, said gaging pad being so dimensioned relative to said recess and the inner ends of said sleeves as to provide passage means for exhausting the flow of air therebetween in accordance with the clearance between said insert and the bottom of said rectangular recess to thereby indicate the diameter between opposed lands at any selected position of the spindle in the barrel.

3. In an air gage for indicating changes in the bore diameter of a rifled firearm barrel having helically extending lands and grooves, a cylindrical spindle of slightly lesser diameter than the bore to be gaged, said spindle having diametrically opposed longitudinal recesses formed into the periphery thereof, a gaging pad loosely seated in each of said recesses and comprising a substantially rectangular segmental portion having an exterior periphery concentric with the cylindrical surface of said spindle, said gaging pad being of sufficient length and width to assure contact of said exterior periphery thereof with at least two adjacent lands in the barrel at any radial position therein, sleeve means on either end of said spindle for loosely retaining said gaging pads therein for movement in all outward directions relative to said spindle, said cylindrical spindle having a longitudinal bore extending into one end thereof and a radially disposed orifice communicating between said axial bore and each of said rectangular recesses for providing passage of a flow of air against said gaging pads, and spring means operative between each of said gaging pads and the bottom of said recesses for holding said gaging pads radially outwardly whereby any decrease in the land diameter of the barrel moves said gaging pads inwardly toward one another thereby controlling the escape of air from said orifices to indicate the bore diameter of the barrel at any selected position of said spindle in the barrel.

4. In an air gage for indicating changes in diameter between opposite helical rifling lands in the bore of a firearm barrel, a cylindrical spindle having an enlarged central portion of slightly smaller diameter than the minimum bore to be gaged, a sleeve encircling either end of said spindle in abutment with said enlarged central portion and in peripheral alignment therewith, said enlarged central portion of said spindle having a rectangular recess therein extending between and within the inner ends of said sleeves, a gaging pad movably seated in said recess and comprising a segmental gaging portion of slightly lesser length than the distance between the inner ends of said sleeves and a reduced segmental portion projecting from either end of said gaging portion to terminate inwardly of the ends of said recess, said gaging portion and each of said reduced end portions of said gaging pad being formed on respective radii such that the exterior periphery of said gaging portion is in tangential line contact with two adjacent rifling lands in a maximum allowable bore of the barrel when the exterior peripheries of said segmental reduced end portions are in full mating engagement with the interior peripheries of said sleeves, and pneumatic means for moving said gaging pad radially outwardly in said spindle to contact the adjacent rifling lands in the barrel whereby the clearances between said gaging pad and said rectangular recess in said spindle and between the exterior peripheries of said reduced end portions of said gaging pad and the interior peripheries of said sleeves permit said gaging pad to tilt in response to dimensional variations between adjacent rifling lands without affecting the accuracy in gaging the variations between opposite lands at any radial position of said spindle in the barrel.

5. In an air gage for indicating changes in diameter between opposite helical rifling lands in the bore of a firearm barrel, a cylindrical spindle having an enlarged central portion of slightly smaller diameter than the minimum bore to be gaged, a sleeve encircling either end of said spindle in abutment with said enlarged central portion and in peripheral alignment therewith, said enlarged central portion of said spindle having a rectangular recess therein extending between and within the inner ends of said sleeve, a gaging pad of lesser length and width than said rectangular recess in said spindle and comprising a segmental gaging portion movably disposed between the inner ends of said sleeves and a reduced segmental portion projecting from either end of said gaging portion to extend into said sleeves, said gaging portion being shorter than the distance between the inner ends of said sleeves to provide limited longitudinal movement of said gaging pad in said spindle but at the same time being greater in width than the distance between at least two adjacent rifling lands measured along a line transverse to the bore axis of the barrel, said gaging portion and each of said reduced end portions of said gaging pad being formed on respective radii such that the exterior periphery of the former is in tangential line contact with adjacent rifling lands in a maximum allowable bore in the barrel when the exterior periphery of the latter is in mating engagement with the interior periphery of said sleeves, and pneumatic means for moving said gaging pad radially in said spindle to contact the rifling lands in the barrel whereby the combination of longitudinal and lateral movement of said gaging pad in said spindle permits tilting of said pad in response to dimensional variations between adjacent rifling lands without affecting the accuracy of gaging the variations between opposite lands, each of said segmental end portions being formed on such radius and being of such height as to provide an arcuate exterior periphery substantially equivalent to one-third of the circumference of the interior periphery of said sleeve for minimizing lateral tilting of said gaging pad during the gaging of a maximum bore in the barrel.

6. In an air gage for indicating changes in diameter between opposite helical rifling lands in the bore of a firearm barrel, a cylindrical spindle having an enlarged central portion of slightly smaller diameter than the minimum bore to be gaged, a sleeve encircling either end of said spindle in abutment with said central portion and in peripheral alignment therewith, said spindle having oppositely disposed recesses in said enlarged central portion extending therebeyond into said sleeves, a gaging pad movably seated in each of said recesses and comprising a segmental gaging portion of slightly lesser length than the distance between the inner ends of said sleeves and a concentrically reduced segmental portion projecting from either end of said gaging portion to terminate inwardly of the ends of said recess, said gaging portion and each of said reduced end portions of each of said gaging pads being formed on respective radii such that the exterior periphery of said gaging portion is in tangential line contact with two adjacent rifling lands in a maximum allowable bore of the barrel when the exterior peripheries of said segmental reduced end portions are in full mating engagement with the interior peripheries of said sleeves, said cylindrical spindle having a longitudinal bore extending into one end thereof and a radially disposed orifice communicating between said longitudinal bore and the center of each of said rectangular recesses for providing passage of a flow of air against the underside of each of said gaging pads, and spring means interposed between the bottom of said rectangular recess and said gaging pad symmetrically on either side of said orifice in said spindle for urging said gaging pads radially outwardly into contact with the adjacent rifling lands in the barrel whereby the clearances between said gaging pads and said rectangular recesses in said spindle and between the exterior peripheries of said reduced end portions of said gaging pads and the interior peripheries of said sleeves permit independent tilting movement of said gaging pads in response to dimensional variations between adjacent rifling lands without affecting the accuracy in gaging the variations between opposite lands at any radial position of said spindle in the barrel.

References Cited in the file of this patent

UNITED STATES PATENTS

| | | |
|---|---|---|
| 2,490,375 | Rupley | Dec. 6, 1949 |
| 2,572,368 | Minix | Oct. 23, 1951 |
| 2,623,294 | Fox | Dec. 30, 1952 |